United States Patent [19]

Juengel

[11] Patent Number: 4,658,509
[45] Date of Patent: Apr. 21, 1987

[54] PROBE HAVING LOW BATTERY DETECTION/TRANSMISSION FEATURE

[75] Inventor: Richard O. Juengel, Romeo, Mich.

[73] Assignee: GTE Valeron Corporation, Troy, Mich.

[21] Appl. No.: 775,425

[22] Filed: Sep. 12, 1985

[51] Int. Cl.$^4$ .................................................. G01B 7/02
[52] U.S. Cl. ..................................... 33/558; 33/172 E
[58] Field of Search ................ 33/558, 559, 561, 551, 33/556, 172 E; 340/539

[56] References Cited

U.S. PATENT DOCUMENTS

| 4,130,941 | 12/1978 | Amsbury | 33/172 E |
| 4,160,246 | 7/1979 | Martin et al. | 340/539 |
| 4,232,308 | 11/1980 | Lee et al. | 340/539 |
| 4,437,240 | 3/1984 | Juengel et al. | 33/558 |
| 4,451,987 | 6/1984 | Cusack | 33/558 |
| 4,509,266 | 4/1985 | Cusack | 33/558 |

OTHER PUBLICATIONS

Big Zero-Senser Trade Literature; 6 pages; Catalog No. 1982, Prototype Performance Specification Number ROS 13—Optically Coupled Probe (OMP/OMM); 24 pages; Renishaw Electrical Limited.
Users Handbook MP3 Probe with 360° Optical Transmission System by Renishaw.
Optical Transmission for Touch Trigger Probes by Renishaw; 2 pages.

Primary Examiner—Willis Little
Attorney, Agent, or Firm—Harness, Dickey & Pierce

[57] ABSTRACT

Provision is made in a battery operated probe for detecting and wirelessly transmitting information to a remote receiver indicating that the battery power in the probe is low. In the preferred embodiment, both probe stylus position information and low battery information are transmitted by way of at least one infrared optical transmission device in the probe. A pair of phase locked loop circuits in the remote receiver are used to discriminate stylus position information from low battery condition information in the optical transmission.

11 Claims, 5 Drawing Figures

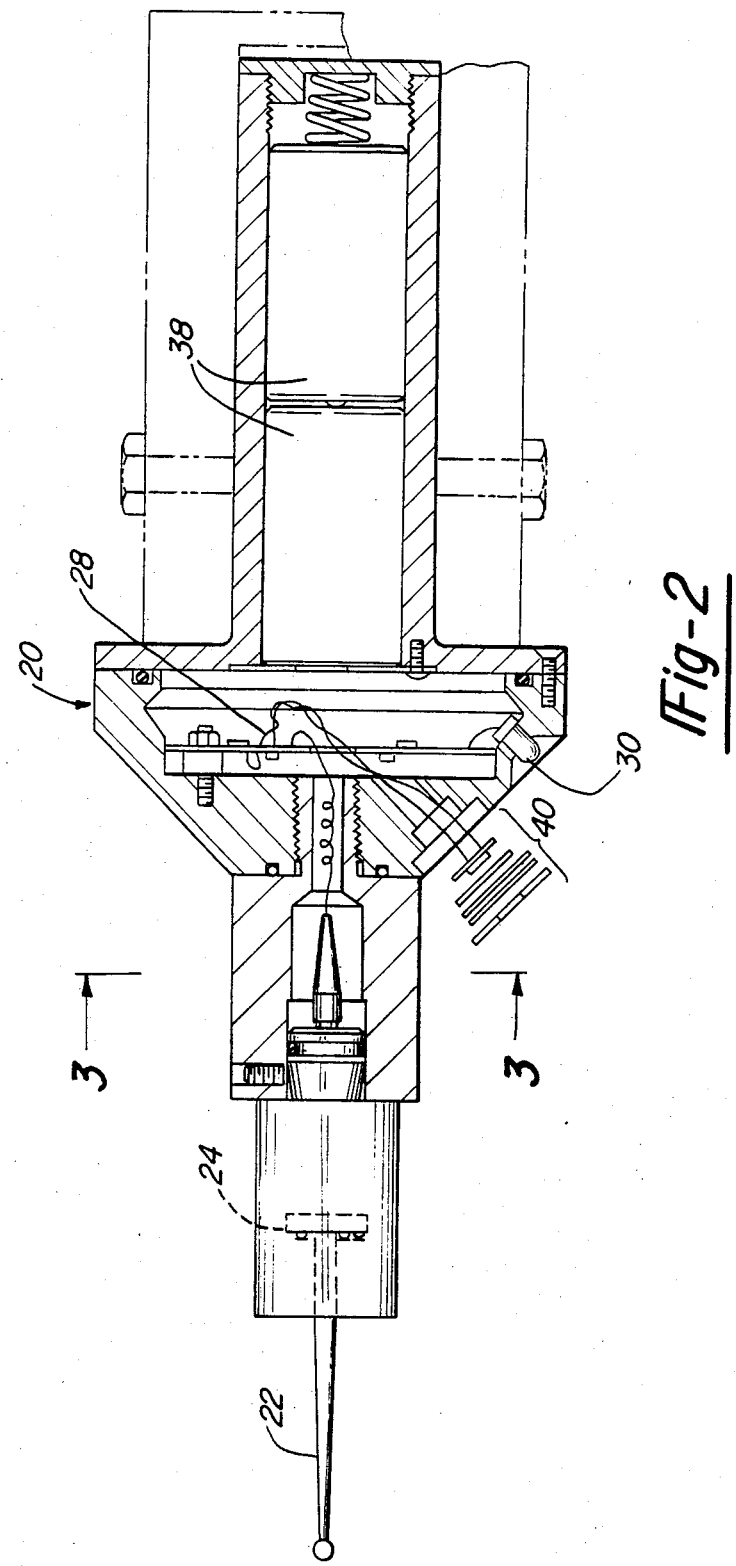

PROBE HAVING LOW BATTERY DETECTION/TRANSMISSION FEATURE

TECHNICAL FIELD

This invention relates to inspection systems and, more particularly, to battery operated probes used for inspecting workpieces in a machine tool environment.

BACKGROUND ART

The trend in automated machine tool systems is to require less and less operator intervention through the use of programmable machine tool controllers. The lack of direct continuous supervision by an operator increases the need for the use of various inspection devices and for means to ensure that such inspection devices are operating properly. One such inspection device is known as a touch probe. A touch probe generally includes a stylus that projects from one end of a housing, the stylus being moveable from its rest position when it touches an object. The probe is generally used like other tools in the system except that it is used to touch a workpiece surface and transmit information in response thereto back to the machine controller. Examples of touch probes are disclosed in U.S. Pat. Nos. 4,451,987 to Cusack and 4,509,266 to Cusack, both of which are assigned to the assignee of the present invention and are hereby incorporated by reference herein.

A particularly advantageous probe desihgn uses an infrared optical transmission of stylus position information to a remote receiver located within the general vicinity of the probe. One such probe transmission scheme is disclosed in the referenced U.S. Pat. No. 4,509,266 above. Unfortunately, the batteries used in probes of these types have somewhat limited useful lives. One approach used in the past to detect weak batteries is to light a lamp on the probe to indicate to the operator that the battery is low and needs to be replaced. This approach does, however, require an operator to be present in order to see that the low battery lamp has been activated. In addition, it can be sometimes difficult for the operator to see the lamp depending upon the lighting conditions in the area and the orientation of the probe.

SUMMARY OF THE INVENTION

An improved inspection system is provided by way of this invention and includes a battery probe with a moveable stylus adapted to move fromits rest position upon contact with an object. The probe includes wireless transmission means for generating a transmission containing information about the stylus position. Means are also provided in the probe for detecting a low battery condition and for wirelessly transmitting information relating to the low battery condition to a remote receiver to thereby indicate to the machine controller that the battery in the probe needs to be replaced. Thus, the low battery condition is automatically detected without the need for any direct operator intervention. In the preferred embodiment, the probe includes at least one optical transmitting device which is used to transmit information about both the stylus position and the battery condition.

BRIEF DESCRIPTION OF THE DRAWINGS

The various advantages of the present invention will become apparent to one skilled in the art upon reading the following specification and by reference to the drawings in which:

FIG. 2 is a cross-sectional view of an example of a probe in which the improvements of the present invention find particular utility;

DESCRIPTION OF A PREFERRED EMBODIMENT

Figure 1:
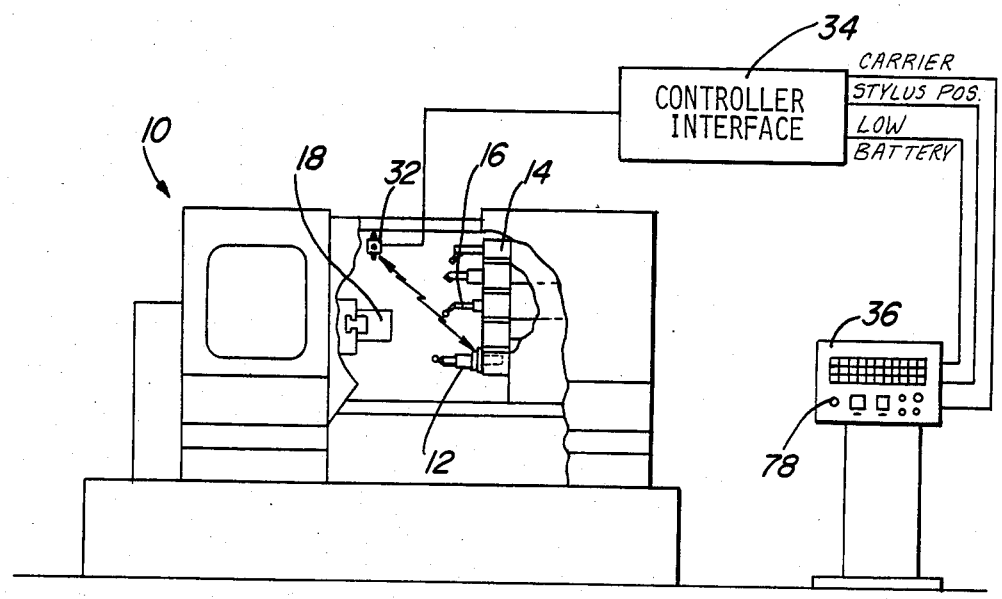
FIG. 1 is a simplified side view illustrating a probe inspection system in use in a typical machine tool environment.

The present invention will be described in connection with the use thereof in a machine tool system such as a numerically controlled turning center 10 illustrated in FIG. 1. Shown therein is a probe 12 which is mounted in a turret 14 in the same manner as other tools 16 which actually perform machining operations on the workpiece 18.

Figure 3:
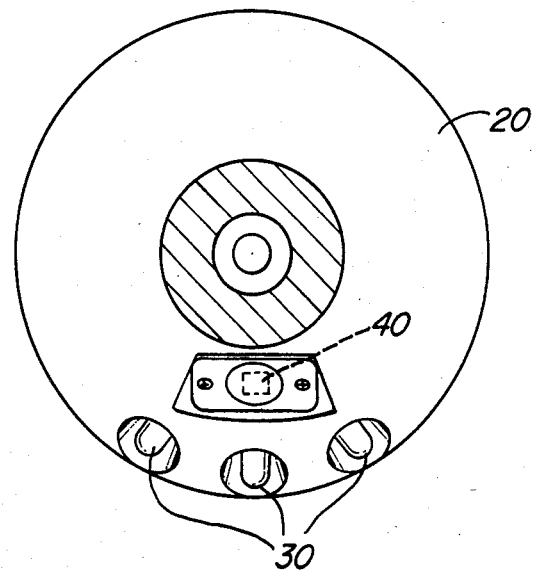
FIG. 3 is a cross-sectional view taken along the lines 3—3 of FIG. 2.

The construction of the probe 12 is shown most clearly in FIGS. 2 and 3. The probe includes a housing generally designated by the numeral 20 and a moveable stylus 22 extending from one end thereof. The internal end of the stylus is connected to a switch mechanism schematically illustrated at 24. When the stylus contacts an object, such as the surface of workpiece 18, the stylus is moved from its rest position and opens one or more of three serially connected switches S1-S3. When this happens, transmission circuitry 26 located, for example, on circuit board 28, causes infrared light emitting diodes 30 to transmit information about the stylus position to a remote receiver head 32. Receiver head 32 includes a photodetector and suitable signal conditioning circuitry therein for converting the infrared optical transmission to an electrical signal which is, in turn, communicated to a controller interface 34. The controller interface 34 provides output signals relating to the status of the probe to machine controller 36. Although not particularly pertinent to the present discussion, the power delivered from probe batteries 38 to the transmission circuitry 26 can be automatically turned on by controller 36 by causing head 32 to transmit an optical signal that is received by a photodetector 40 in the probe. For furlther details about the probe operation and construction, the reader is referred to the above referenced U.S. Pat. No. 4,509,266. However, it should be understood, that the low battery detection and transmission feature of the present invention can be used in a wide variety of different probe constructions, for example, those used in machining centers where the light emitting diodes are mounted in a 360 degree orientation about the probe housing. In fact, the present invention finds broad utility in a wide variety of applications where it is desirable to wireless detect a low battery condition for a device.

Figure 4:
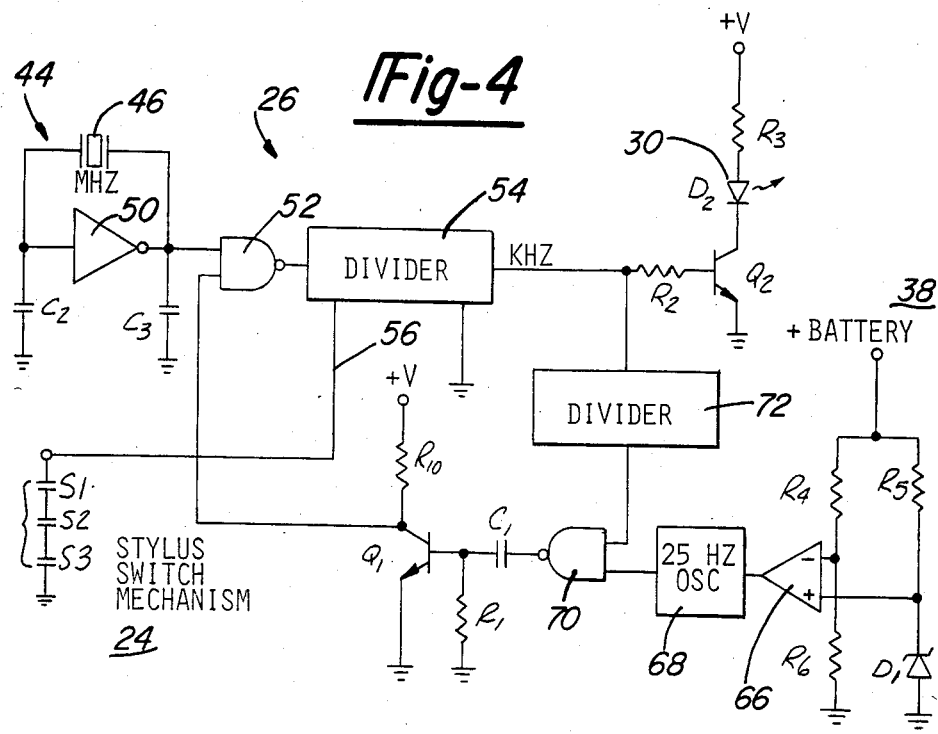
FIG. 4 is a schematic illustration of circuitry used in the probe.

Turning attention now to the probe transmission circuitry 26 which is shown in block diagram form in FIG. 4, a master oscillator 44 comprised of crystal 46, amplifier 50 and capacitors C2, C3 provide a source of high frequency AC signals. By way of a nonlimiting example, the oscillator 44 is designed to provide a 1.8 megahertz output signal.

During normal probing operations (i.e., when the battery is good), the oscillator signals passs through NAND gate 52 and through a divide by "n" counter divider 54. Divider 54, in this embodiment, is a commercially available component number 4526 counter which is configured to divide the input signal by the number 12 or 13 depending upon the state of the control line 56. Control line 56 is connected to the stylus switch mechanism 24 which is represented in FIG. 4 as three serially connected switches S1, S2 and S3. When the stylus is in its rest position, the output of the divider 54 is at a frequency of 150 kilohertz. The signal is used to drive the probe LEDs 30 (only one of which is shown in FIG. 4). This is accomplished by varying the conduction current through the LEDs at the 150 kilohertz rate via transistor Q2. When the stylus moves from its rest position, the state on control line 56 changes due to the opening of one or more of the switches S1–S3 and thus, the master oscillator frequency is divided by 13 instead of 12 thereby providing an LED drive frequency of 138 kilohertz.

Figure 5:
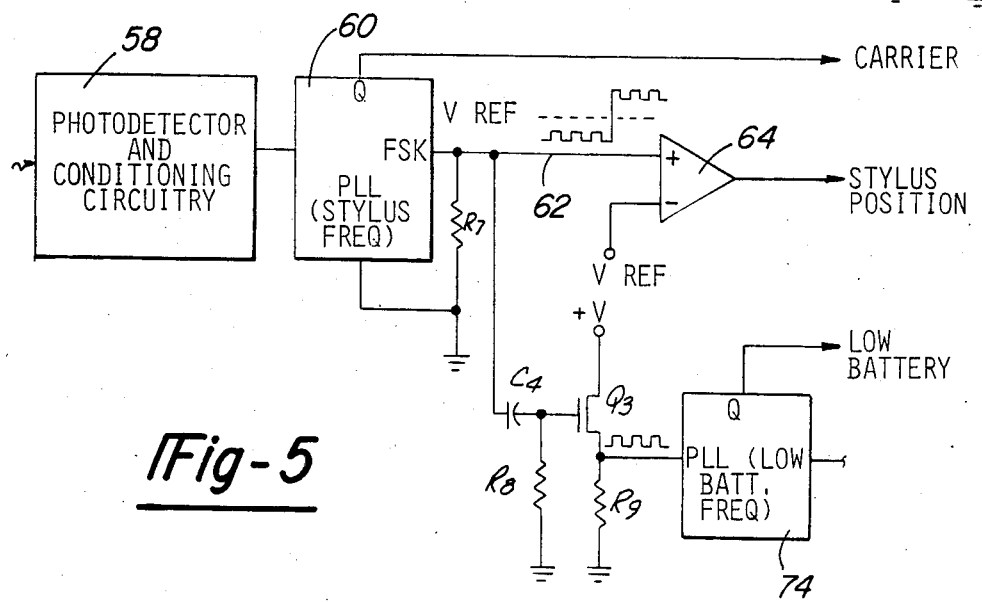
FIG. 5 is a schematic illustration of circuitry used in the remote receiver.

A block diagram of the circuitry in the remote receiver section of the system is shown diagramatically in FIG. 5. Again assuming a good battery condition, suitable photodetector and conditioning circuitry 58 in the head 32 detects the infrared optical transmission from the probe and converts it into electrical signals having generally the same frequency characteristics as the optical transmission. The remainder of the circuitry of FIG. 5 is conveniently located in the controller interface 34. It includes a first phase locked loop circuit 60 such as a commercially available component XR2211. Phase locked loop (PLL) 60 is turned to track a band width that includes the two frequencies (138 and 150 kHz) containing the probe position information. The band width is also wide enough to track small deviations (about 3%) of those frequencies for battery condition detection purposes that will be later explained herein. As is known in the art the output of PLL 60 labeled Q will provide an indication that at lreast some probe transmission within the given band width has been received. This is labeled as the "carrier" output and can be used by the controller 36 for various reasons such as to provide an initial indication that the probe is operating properly. Another PLL output 62 labeled "FSK" (frequency shift key) provides an output whose amplitude is generally proportional to the frequency of the received transmission.

Various means can be provided for detecting whether the output on line 62 is associated with the stylus position being in its rest position or whether it has moved upon touching an object. For example, a comparator 64 can be utilized having a reference voltage (V REF) appropriately chosen so that the comparator 64 will trip when the output from PLL 60 passes through V REF due to the large shift in frequency from 138 to 150 KHz. Thus, it is possible to detect the stylus position information of the infrared transmission.

Returning now to the probe circuitry of FIG. 4, means are provided for detecting a low battery condition of battery supply 38. In FIG. 4, this is represented by the voltage divider network comprised of resistors R4, R5 and R6 taken together with a reference diode D1. When the battery voltage drops below a predetermined reference, it trips comparator 66 and enables a 25 hertz oscillator 68. The output of oscillator 68 is connected to one input of NAND logic gate 70 whereas another input is connected to another divide by "n" binary counter divider 72 which is driven from the output of divider 54. In this embodiment, divider 72 is a divide by 8 binary counter. Thus, the output of gate 70 is normally an 18.75 kilohertz signal (150 KHz/8), gated off and on at a 25 hertz rate. During the positive swing of the output signal from gate 70, transistor Q1 is driven into conduction for a short time, forcing its oscillator lead to ground. This creates a 1.6 microsecond negative going pulse once every 53 microseconds and causes gate 52 to stop conducting thereby blocking the master oscillator output from reaching the counter divider 54. Thus, gate 52 has "swallowed" a few clock pulses resulting in a slightly lower frequency at the divider 54 output. With the values discussed so far, this means that only 93 pulses will be applied to the input of divider 54 instead of the usual 96. The valves of R1, C1 and the division ratio of the counter divider 72 are chosen to provide such a small deviation of the usual stylus position frequency signals that it will not disturb the normal touch/rest stylus position detection functions of the circuitry in the remote receiver, yet the deviations are large enough to be detectable. Preferably, the frequency deviation should be less than about 3%. This "deviation" frequency is repetitiously created at a 25 hertz rate due to the activation of the oscillator 68 when the battery 38 is low. In other words, the 150 KHz (stylus in rest position) and 138 KHz (stylus moved) signals can be considered as alternative carriers which are selectively frequency modulated by the oscillator 68 at the 25 Hz rate.

Means are provided in the receiver circuitry for discriminating between the stylus position information and the battery condition information in the optical transmission. In FIG. 5, this consists primarily of a second phase locked loop circuit 74 which is turned to the low battery frequency signal, i.e., the 25 hertz modulating signal provided by oscillator 68 in the probe transmission circuitry. Capacitor C4 and resistor R8 are appropriately chosen to serve as a high pass filter to filter out the DC components from PLL 60 whereas field effect transistor Q3 and resistor R9 serve as a suitable buffer amplifier. Accordingly, PLL 74 will provide an output labeled "low battery" whenever the 25 hertz modulating signal on either of the stylus position carrier frequencies is detected.

The waveform above line 62 in FIG. 5 schematically represents the alternative outputs from PLL 60 with the low battery modulating signal being present in both cases. If the stylus is in the rest position, the entire output will be above V REF even though there is some small, but detectable deviation due to the modulation of the 150 KHz signal by the battery detection circuitry. Likewise, the entire output is below V REF when the stylus has moved from its rest position. Thus, the simplicity of the probe position detection function can be used while at the same time the present invention is able to detect low battery conditions by the demodulating function provided by the second PLL 74.

From the foregoing, those skilled in the art can appreciate that the low battery signal from interface 34 can be used to automatically "inform" controller 36 that the battery needs to be replaced. Controller 36 can then provide suitable warnings to the operator and/or adjust or stop the machining and inspection operations until such time as the batteries are replaced. This can be accomplished by lighting a warning lamp 78 on the controller console, by providing a print out that is read periodically by the operator, or the like. The battery detection/transmission scheme of the present invention provides a simple and reliable method of providing not only stylus positional information but also battery condition information without requiring extensive modification of circuitry or structural components of existing probes. Those skilled in the art will obviously discover other advantages and that various modifications of the specific example given herein will become apparent to them after a study of the specification, drawings and following claims.

What is claimed is:

1. In an inspection system having a battery operated probe with a moveable stylus adapted to move from its rest position upon contact with an object, the probe including optical transmission means having at least one optical device for emitting an optical transmission containing information about the stylus position, and remote receiver means for receiving the optical transmission from the probe, wherein the improvement comprises:

first means in the probe for detecting a low battery condition;

second means in the probe for driving the optical device at a frequency that is capable of being detected by the remote receiver means, said second means driving said optical device in a first predetermined manner when the stylus is in a rest position, said second means driving the optical device in a second predetermined manner when the stylus moves from its rest position upon contact with an object, and said second means driving said optical device in a third predetermined manner in response to detection of a low battery condition by the first means whereby the same optical device is used to transmit both stylus position information and low battery information to the remote receiver.

2. The improvement of claim 1 wherein the improvement further comprises:

third means in the remote receiver for discriminating between stylus position information and low battery information in the optical transmission from the probe.

3. The improvement of claim 1 wherein the stylus position information is generated by driving the optical device with an AC signal at a first frequency when the stylus is in a rest position and by shifting the frequency thereof to a second frequency when the stylus moves from its rest position; and wherein the frequency of the signal driving the optical device is repetitively deviated at a third frequency which is substantially lower than the first and second frequencies when a low battery condition is detected thereby providing the low battery information in the optical transmission.

4. The improvement of claim 3 wherein the third means in a remote receiver comprises:

first phase locked loop means turned to a frequency band including the first and second frequencies, adapted to provide an output indicating whether the optical transmission was generated at substantially the first or second frequency thereby detecting the position of the probe stylus; and second phase locked loop means turned to the third frequency, adapted to generate an output indicating a low battery condition when the frequency of the signal received by the first phase locked loop means repetitively deviates at the third frequency rate.

5. The improvement of claim 1 wherein the optical transmission means comprises a plurality of infrared light emitting diodes.

6. The improvement of claim 5 wherein said light emitting diodes are located on peripheral portions of a housing for the probe.

7. The improvement of claim 1 wherein said first predetermined manner comprises driving the optical device at a first frequency;

wherein said second predetermined manner comprises driving the optical device at a second frequency, shifted from said first frequency; and wherein said third predetermined manner comprises driving the optical transmission means in a manner different than at said first and second frequencies.

8. A method of transmitting positional information about a probe stylus as well as probe battery condition in an inspection system utilizing a battery operated probe, said method comprising:

transmitting an optical signal of a first frequency when the stylus is in a first rest position;

shifting the optical transmission from said first frequency to a second frequency when the stylus moves from its rest position;

causing the optical transmission to repetitively deviate from said first or second frequencies by a given percentage at a repetition rate which is at a substantially different third frequency upon detection of a low battery condition;

detecting said first and second frequencies at a remote location thereby determining probe stylus information; and detecting the presence of said third frequency at said remote location to thereby provide an indication of a low battery condition.

9. A battery operated probe having a moveable stylus for detecting contact with an object, said probe comprising:

master oscillator means providing alternating current signals of a first frequency at an output thereof;

first divider means having an input and an output, as well as a control input for dividing the frequency of a signal at the divider input by a given amount depending upon the state of the control input;

the output of the first divider being connected to at least one optical transmission device, with the state of the control input being determined by the position of the probe stylus;

second divider means having an input connected to the first divider output, adapted to divide the frequency at the input thereof by a predetermined amount;

battery detection circuit means connected to the battery and being adapted to provide a given output signal upon detection of a low power level from the battery below a given reference;

secondary oscillator means for providing an alternating current signal at an output thereof at a frequency substantially lower than the frequency at the output of the first divider, said secondary oscillator being activated upon receipt of the given signal from the battery detection circuitry;

first gating means having inputs connected to the outputs from the second divider and said secondary oscillator adapted to provide an output signal at a given repetition rate when the secondary oscillator is activated; and second gating means having an input connected to the output from the master oscillator and another input coupled to the output of said first gating means, said second gating means having an output connected to the input of the first divider means;

whereby the output frequency of the first divider is repetitively deviated by a given amount at a frequency determined by said second oscillator means upon detection of a low battery condition which can be sensed by a remote receiver.

10. The system of claim 9 wherein said master oscillator is adapted to provide alternating current signals in the megahertz frequency range wherein the output of the first divider is adapted to provide alternating current signals in the kilohertz frequency range, and wherein the secondary oscillator is adapted to provide alternating current signals in the hertz range.

11. The system of claim 9 which further includes a remote receiver comprising:

a first phase locked loop circuit means having an input connected for receipt of the optical transmission from the probe, adapted to provide an output whose amplitude is a function of the input frequency;

means coupled to the output of the first phase locked loop means for determining stylus position information from the optical transmission; and second phase locked loop means coupled to the output of the first phase locked loop means, adapted to detect the presence of a repetitively occurring signal at substantially the same frequency as the secondary oscillator thereby providing an indication of a low battery condition in the probe.

* * * * *